US009019560B2

(12) United States Patent
Yasukawa et al.

(10) Patent No.: US 9,019,560 B2
(45) Date of Patent: Apr. 28, 2015

(54) IMAGE FORMING METHOD

(71) Applicant: Konica Minolta, Inc., Tokyo (JP)

(72) Inventors: Hiroyuki Yasukawa, Tokyo (JP); Shoichi Nomura, Tokyo (JP); Kentarou Mogi, Tokyo (JP); Asao Matsushima, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/211,845

(22) Filed: Mar. 14, 2014

(65) Prior Publication Data

US 2014/0285820 A1 Sep. 25, 2014

(30) Foreign Application Priority Data

Mar. 25, 2013 (JP) ................................ 2013-061490

(51) Int. Cl.
*G06F 3/12* (2006.01)
*G03G 15/00* (2006.01)
*G03G 15/01* (2006.01)

(52) U.S. Cl.
CPC ........ *G03G 15/6585* (2013.01); *G03G 15/0189* (2013.01)

(58) Field of Classification Search
None
See application file for complete search history.

(56) References Cited

U.S. PATENT DOCUMENTS 5,234,783 A * 8/1993 Ng ............................ 430/45.53
6,608,641 B1 * 8/2003 Alexandrovich et al. ..... 347/131
7,502,582 B2 * 3/2009 Ng et al. ....................... 399/296
2002/0159794 A1 * 10/2002 Nakashima et al. .......... 399/237
2004/0067082 A1 * 4/2004 Uehara et al. ................ 399/341
2006/0044617 A1 * 3/2006 Wang et al. .................. 358/3.06
2006/0051114 A1 * 3/2006 Ng ................................. 399/53
2006/0187505 A1 * 8/2006 Ng et al. ....................... 358/518
2010/0247125 A1 * 9/2010 Akita ............................. 399/49
2011/0123209 A1 * 5/2011 Akita ............................. 399/49
2012/0196223 A1 * 8/2012 Fowlkes ..................... 430/124.1
2012/0251169 A1 * 10/2012 Aoki et al. .................... 399/111
2013/0195508 A1 * 8/2013 Shigezaki et al. ............ 399/223
2013/0216793 A1 * 8/2013 Sasaki et al. ............... 428/195.1
2013/0244152 A1 * 9/2013 Yoshida et al. ............... 430/105
2014/0119779 A1 * 5/2014 Zaretsky et al. .............. 399/231

FOREIGN PATENT DOCUMENTS

JP 11202583 A 7/1999
JP 2005031197 A 2/2005
JP 2007108585 A 4/2007
JP 2009 229836 A 10/2009

* cited by examiner

*Primary Examiner* — Kimberly A Williams
(74) *Attorney, Agent, or Firm* — Lucas & Mercanti, LLP

(57) ABSTRACT

An image forming method which is capable of preventing occurrence of moire and forming images having sufficient color saturation and a sufficient gloss is provided. The color toner image is formed in accordance with a color image signal obtained through screen processing using a screen pattern having a screen line count of 50 to 270 lpi on manuscript image data, and the clear toner image is formed in accordance with a clear image signal obtained through contone processing on the manuscript image data. The clear image signal is controlled so that, according to the amount of the color toner per unit area of the stacked toner image obtained by the color toner image being superimposed with the clear toner image, the less the amount of the color toner, the more the amount of the clear toner becomes.

14 Claims, 3 Drawing Sheets

(a)

(b)

IMAGE FORMING METHOD

CROSS REFERENCE TO RELATED APPLICATION

This Application claims the priority of Japanese Patent Application No. 2013-061490 filed on Mar. 25, 2013, which is incorporated by reference herein.

TECHNICAL FIELD

The present invention relates to an image forming method which is capable of collectively fixing a color toner image and a clear toner image and then outputting a glossy image.

BACKGROUND ART

The image forcing apparatus of electrophotographic system, for example, a full-color image forming apparatus, provides output typically in a manner such that using toners of three colors, yellow, cyan, and magenta, or toners of four colors with black added to the three colors, dots of each color toner are to rood on an lavage support such as a sheet of papery thereby allowing a full-color image to be visually identified as a whole.

In an electrophotographic system, halftone images can be formed, for example, according to data obtained by performing screen processing using a dither matrix on image data to be turned into a manuscript.

On the other hand, the color toner has been used in combination with a clear toner, thereby allowing the resulting image to have a gloss. To form glossy images, carious types of clear toner images have been suggested.

For example, disclosed in Patent Literatures 1 and 2 is to form a clear toner image so treat a clear toner does not exist on the parallel lines of a color toner image formed through the screen processing but the clear toner exists between the parallel lines.

Furthermore, disclosed in Patent Literatures 3 and 4 is to form a clear toner image using a screen having a greater number of lines than that of a screen used to form a color toner image.

However, there was the problem with the method disclosed in Patent Literatures 1 and 2 that in practice, a positional deviation tends so occur in the position of adhesion, of the clear toner because the resist is controlled with, difficulty, thereby causing the resulting image not to be smoothed and thus not to be glossy as intended. There was also the problem with the method disclosed in Patent Literatures 3 and 4 chat in forming a toner image using a screen having a large number of lines, precise control has to be provided to the diameter of a laser beam used for exposure. However, there is a limit to the preciseness of the control, and the use of the screen may result in degradation in image quality due to interference such as moire.

CITATION LIST

Patent Literature

Patent Literature 1: Japanese Patent No. 3255104

Patent Literature 2: Japanese Patent application Lard-Open No. 2005-031197

Patent Literature 3: Japanese Patent No. 4701988

Patent Literature 4: Japanese Patent Application Laid-open No. 2009-229836

SUMMARY OF INVENTION

Technical Problem

The present invention has been made in view of the foregoing circumstances and has as its object the provision of an image forming method which can prevent the occurrence of moire and form an image having sufficient color saturation and a sufficient gloss.

Solution to Problem

An image forming method of the present invention employs an electrophotographic system to form a stacked toner image which has a color toner image of a color toner and a clear toner image of a clear toner superimposed one on another in that order on an image support, and then collectively fixes the resulting stacked toner image on the image support. The image forming method comprises the following steps:

forming the color toner image in accordance with a color image signal obtained through screen processing using a screen pastern having a screen line count of 50 to 270 lpi on manuscript image data; and forming the clear toner image in accordance with a clear image signal obtained through condone processing on the manuscript image data, wherein the clear image signal for forming the clear toner image is controlled so treat according to the amount of the color toner per unit area of the stacked toner image obtained by the color toner image being superimposed with the clear toner image, the less the amount, of the color toner per unit area, the more the amount of the clear toner becomes.

In the image forming method of the present invention, the color toner image is preferably formed using a screen pattern having a screen line count of 80 to 200 lpi.

In the image forming method of the present invention, the color toner and the clear toner each preferably have a volume-based median diameter of 3 to 10 μm.

In the image forming method of the present invention, the clear toner preferably has a volume-based median diameter that is smaller than the volume-based median diameter of the color toner.

In the image forming method of the present invention, the clear image signal is preferably controlled in a manner such that the compensating amount of the clear toner is supplied depending on the amount of adhered color toner for forming the color toner image so that the total amount of adhered color and clear toners is the pre-set amount of adhered toner.

The image forming method of the present invention preferably employs, as the color toner, a yellow toner, a magenta toner, a cyan toner and a black toner; and preferably forms a solid image which has the amount of adhered toner of each of the yellow toner, the magenta toner, the cyan toner and the black toner of not more than 4 $g/m^2$ and which has the total amount of adhered toner of the yellow toner, the magenta toner, the cyan toner and the black toner of greater than 3.0 $g/m^2$ and not greater than 10 $g/m^2$. The image forming method is preferably configured such that the pre-set amount of adhered toner fails within the range of 3.1 to 10.1 $g/m^2$.

The image forming method of the present invention preferably employs, as the color toner, a yellow toner, a magenta toner, a cyan toner and a black toner; and preferably forms a halftone image which has the total amount of adhered toner of each of the yellow toner, the magenta toner, the cyan toner and the black toner of 0.5 to 3.0 $g/m^2$. The image forming method is preferably configured such that the pre-set amount of adhered toner falls within the range of 0.6 to 3.1 g/m$^2$.

Advantageous Effects of Invention

According to the image forming method of the present invention, a clear toner image to be deposited on a color toner image is formed in accordance with a clear image signal obtained through the contone processing. It is thus possible to prevent the occurrence of moire and prevent the amount of a clear toner for forming the clear toner image deposited on the color toner image from, becoming excessive, thus providing sufficient color saturation. It is also possible to form an image having a sufficient gloss because the clear toner image is formed in a controlled manner such that the less the amount of the color toner per unit area of a stacked toner image, the more the amount of the clear toner becomes.

DESCRIPTION OF EMBODIMENTS

Now, the present invention will be described more specifically below.

An image forming method of the present invention employs an electrophotographic system to form a stacked toner image which has a color toner image of a color toner and a clear toner image of a clear toner superimposed one on another on an image support, and collectively fixes the resulting stacked toner image on the image support. The color toner image is formed in accordance with a color image signal obtained through screen processing using a screen of a line count of 50 to 270 lpi on manuscript image data or original data, and the clear toner image is formed in accordance with a clear image signal obtained through contone processing on the manuscript image data. In this method, the clear image signal for forming the clear toner image is controlled so that according to the amount of the color toner per unit area of the stacked, toner image obtained by the color toner image being superimposed one on another with the clear toner image, the leas the amount of the color toner per unit area, the more the amount of the clear toner becomes.

Figure 1:
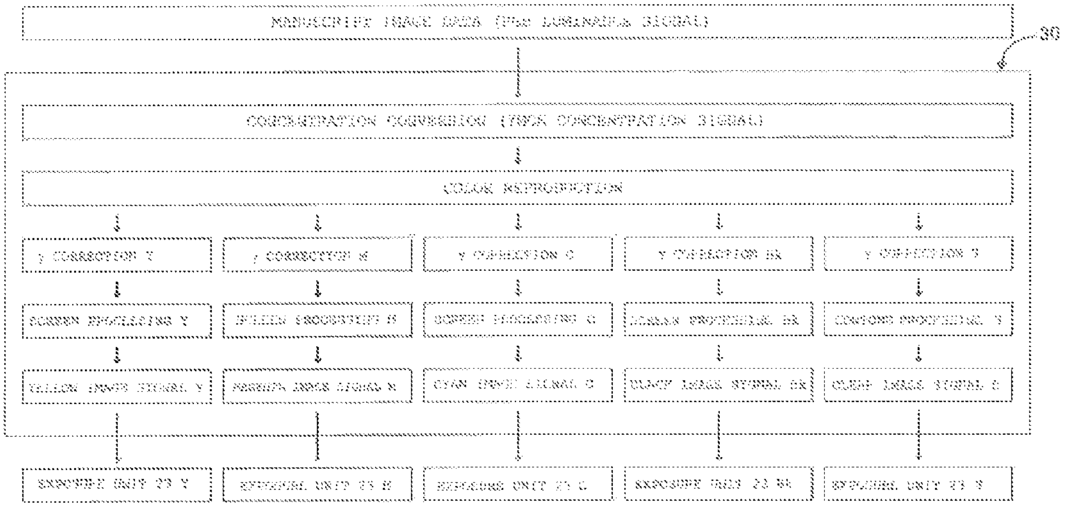
FIG. 1 is a schematic view illustrating the image processing in an image forming method of the present invention.

Specific Image Processing:

As shown in FIG. 1, a clear toner image and a color toner image are formed in accordance wish a color image signal and a clear image signal for exposure that are obtained by allowing an image processing unit 30 to perform the following specific image processing on manuscript image data read by a manuscript image reader SC (see FIG. 2), to be discussed later, or manuscript image data entered from an external device. More specifically, the clear toner image and the color toner image are formed by allowing a clear image signal S for exposure for forming a clear toner image, and a yellow image signal Y, a magenta image signal M, a cyan image signal C and a black image signal Bk for forming a color toner image to be entered to the exposure units 23S, 23Y, 23M, 23C and 23Bk (see FIG. 2) of an image forming apparatus, respectively.

In the specific image processing, the entered manuscript image data signal (RGB luminance signal) is separated into each color of yellow (Y), magenta (M), cyan (C) and black (Bk) (concentration conversion), and then the color separated image data signal of each color is subjected to color reproduction processing. Then, image processing for forming a color toner image and image processing for forming a clear toner image are performed in parallel.

Image Processing for Forming Color Toner Image:

In the image processing for forming a color toner image, γ correction (γ correction Y, γ correction M, γ correction C and γ correction Bk) and screen processing (screen processing Y, screen processing M, screen processing C and screen processing Bk) are sequentially performed on the image data resulting from the color reproduction, thereby providing a color image signal for exposure (the yellow image signal Y, the magenta image signal M, the cyan image signal C and the black image signal Bk).

Here, the concentration conversion, the color reproduction processing and the γ correction can each be performed in a conventionally preferred method, Screen Processing:

Specifically, the screen processing for a color toner image is performed by reading a screen pattern to be used for the print job of each, color from respective storage units (not shown) and converting the γ-corrected image data signal of each color according to the screen pattern. The screen patterns of respective colors may preferably have mutually different screen line counts end/or screen angles.

As a specific method for the screen processing, it is possible to make use of a conventionally preferred method.

A plurality of screen patterns to be used in the screen processing are stored in the form of a program in a storage unit (not shown) of the image processing unit 30 in a manner such that the screen patterns having mutually different screen angles or screen line counts can be appropriately selected depending on the purpose.

In the image forming apparatus, the number of types of the screen patterns stored in the storage unit of the image processing unit 30 varies depending on the number of colors or the resolution to be set in the image forming apparatus or the image qualities that are selectable, but can be, for example, 4 to 30.

For a screen pattern of dots, the screen line count of a screen pattern is the number of straight lines connecting between the closest two points in the screen pattern, or for a screen pattern of lines, the screen line count is the number of lines within one inch in a direction perpendicular to the lines.

The present invention always employs a screen pattern having a screen line count of 30 to 270 lpi, and it is preferable to use a screen pattern having, in particular, a screen line count of 80 to 200 lpi.

Use of a screen pattern of a screen line count within the aforementioned range enables forming an image that has a sufficient, resolution and sufficient color saturation. On the other hand, use of a screen pattern of an excessive screen line count would cause the amount of clear toner for forming a clear toner image deposited on a color toner image to be excessive, thus resulting in an image not having desired color saturation.

The screen line count is correlated with the diameter of a laser beam of the exposure unit 23, to be discussed later, and can be controlled by regulating the Laser team diameter.

Assuming that the main scanning direction (the axial direction of a photoreceptor) is a nine- to three-o'clock line, the screen angle of a screen pattern is expressed by a clockwise angle (0° to 180°) from a start point in the nine-o'clock direction about the intersection between the nine- to three-o'clock line and a straight line connecting between the closest two points in a dot screen pattern or a line in a line screen pattern.

To form a so-called solid image, the amount of adhered color toner is adapted such that the amount of adhered color toner of each color is not greater than 4 g/m$^2$, and the total, amount of adhered color toner of each color is greater than 3.0 g/m$^2$ and not greater than 10 g/m$^2$. On the other hand, to form a so-called halftone image, the total amount of adhered color toner of each color is to be 0.5 to 3.0 g/m$^2$.

As the color toner, it is preferable to employ four colors of the yellow toner, the magenta toner, the cyan toner and due black toner.

The amount of adhered toner can be controlled by various types of conventionally known methods without being limited to a particular one. Examples of the methods may include a method, for varying the surface potential, that is, the development bias of a photoreceptor drum 21, to be discussed later. More specifically, it is possible to reduce the amount of toner to be adhered to the surface of the photoreceptor drum 21 with the increasing development bias on the surface of the photoreceptor drum 21.

Image Processing for Forming Clear Toner Image:

In the image processing for forming a clear toner image, the γ correction S is performed on the color reproduced image data in parallel to the γ correction (the γ correction Y, the γ correction M, the γ correction C, and the γ correction Bk) for forming the aforementioned color toner image. After that, in place of the screen processing for forming the aforementioned color toner image, the contone processing is performed, on the image data signal having been subjected to the γ correction S, thereby providing a clear image signal for exposure.

Here, it is possible to make use of a conventionally preferred method for the γ correction to form the clear toner image, Contone Processing:

The contone processing for forming a clear toner image is performed while the amount of a clear toner is being controlled depending on the strength of an image data signal after the γ correction S so that according to the amount of a color toner per unit area of a stacked toner image obtained by a color toner image being superimposed one on another with the clear toner image, the less the amount of the color toner per unit area, the more the amount of the clear toner becomes.

Here, "the unit area of the stacked toner image" shall, have a shape that is consistent with the unit area of the screen pattern for forming a black toner image.

The contone processing for forming the clear toner image is performed specifically by the following steps: first, partitioning the image data signal after the γ correction S according to the screen pattern for forming the black toner image; then, making an adjustment depending on the signal strength of each partition in a manner such that the less the amount of the color toner of the stacked toner image, the more the amount of the clear toner becomes; and further, providing control so as to achieve continuous tones with the adjusted amount of the clear toner in each partition. This allows a clear image signal to be outputted.

The clear image signal can be assumed to be controlled, for example, in a manner such that the amount of clear toner to be compensated depending on the total amount of adhered color toner for forming a color toner image is supplied depending on the thickness of the color toner image so that the total amount of adhered toner of the sum of the color toner of each color and the clear toner becomes a pre-set amount of adhered toner.

The pre-set amount of adhered, toner may be controlled so as to be varied depending on the pixel ratio of an image to be formed. More specifically, control may be provided so as to vary the pre-set amount of adhered toner depending on whether the image to be formed is a solid image or a halftone image.

For example, suppose that the image to be formed is a so-called solid image, that is, the amount of adhered color toner of each color is not greater than 4 g/m$^2$ and the total amount of adhered toner is greater than 3.0 g/m$^2$ and not greater than 10 g/m$^2$ in this case, the setting of the total amount of adhered toner can be, for example, a constant value within the range of 3.1 to 10.1 g/m$^2$.

On the other hand, for example, suppose that the image to be formed, is a so-called halftone image, that is, the total amount of adhered color toner of each color is 0.5 to 3.0 g/m$^2$. In this case, the setting of the total amount of adhered toner can be, for example, a constant value within the range of 0.6 to 3.1 g/m$^2$.

Furthermore, for example, control may also be provided in a manner such that the pre-set amount of adhered toner varies depending on the image region on which a color toner image is formed in one image and the non-image region (hollow region) on which no color toner image is formed.

More specifically, in the non-image region, the total amount of adhered toner can also be set to 0 g/m$^2$ so as not to form a clear toner image.

When the number of gray scales is insufficient in the contone processing for forming the clear toner image, for example, a gray scale correction may be made, as intermediate processing, to assign digits randomly occurring from 4 bits to one input value and convert the resulting digits to 6 bits so as to obtain halftones in a pseudo manner, thereby increasing the number of gray scales.

Specifically, methods for forming the clear toner image according to the clear image signal obtained through the contone processing may include a method, for varying the intensity of a laser beam, or a method for electrically varying the input value of a grid voltage and a bias voltage. Typically, it is preferable to employ the method for electrically varying the input value of a grid voltage and a bias voltage.

As described above, the clear toner image formed, in accordance with a clear image signal obtained through the contone processing is deposited on the color toner image formed in accordance with a color image signal obtained through the screen processing, thereby providing an image which is reduced in moire and has sufficient color saturation and a sufficient gloss.

Thus, first, interference streaks such as moire are prevented because the screen pattern to be used to form the color toner image has a relatively low screen line count as well as the clear toner image is obtained through the condone processing so as to nave a concentration-dependent gray scale property.

Furthermore, the clear toner image obtained through the contone processing prevents the amount of clear toner for forming the clear toner image deposited on the color toner image from being excessive. This in turn prevents the color toner image from being shielded by the clear toner, and as a result, sufficient color saturation can be obtained, dote that the clear toner image obtained through the screen processing would be estimated to never obtain desired color saturation because some regions may have an excessive amount of clear toner deposited on the color toner.

Still furthermore, the clear toner image is formed while control is being provided in a manner such that the less the amount of color toner per unit area of the stacked toner image, the more the amount of clear toner becomes. Thus, the deeper the step height of the amount of adhered toner of the color toner image, i.e., the valley of the screen, the greater the amount of clear toner to be supplied becomes. It is therefore possible to equalize the entire thickness of the stacked toner image and thus smooth the entire surface of the image. Furthermore, since the clear toner image is obtained through the contone processing, the clear toner is slightly deposited even on the region at which the amount of color toner is maximized. As a result, it is possible to form an image having a sufficient gloss.

In the aforementioned specific image processing, other various types of image processing to be performed as appropriate assay also be incorporated as required. As those various types of image processing to be performed as required, it is possible to make use of conventionally preferably employed methods.

Figure 2:
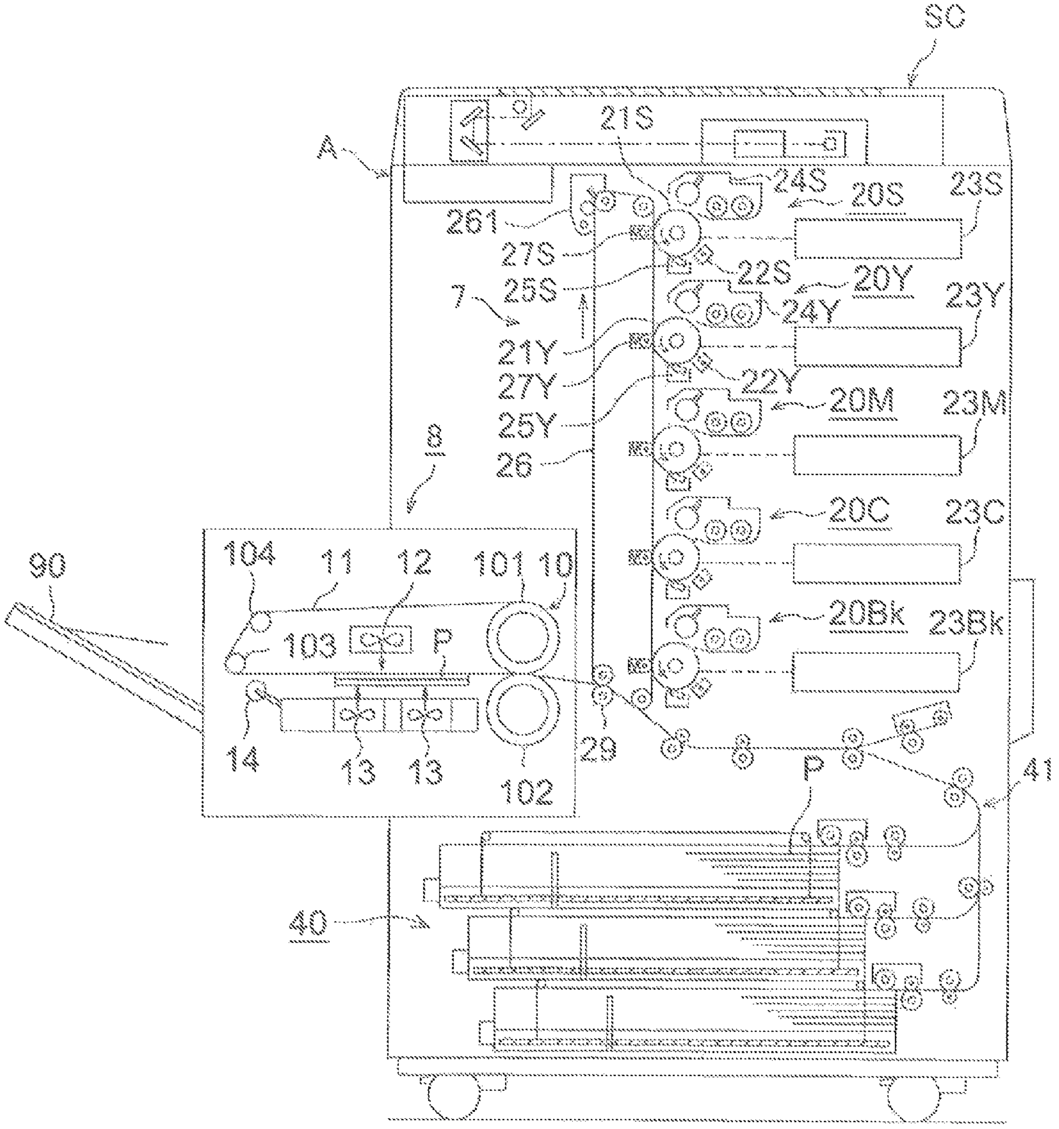
FIG. 2 is an explanatory sectional view illustrating one example of the configuration of an image forming apparatus to be used, for the image forming method of the present invention.

Image Forming Apparatus:

FIG. 2 is an explanatory sectional view illustrating an example structure of an image forming apparatus to be used in the image forming method of the present invention.

This image forming apparatus, which is referred to as a tandem type color image forming apparatus, includes an image forming apparatus main body "A" which includes: a clear toner image formation unit 20S for forming a clear toner image; color toner image formation units 20Y, 20M, 20C and 20Bk for forming yellow, magenta, cyan and black toner images, respectively; an intermediate transfer unit 7 for transferring, to sac image support P, the toner image of each color formed at the clear toner image formation unit 20S or the color toner image formation units 20Y, 20M, 20C or 20Bk so as to form a stanched toner image which has the clear toner image and the toner image of each color deposited one on another; and a fixing unit 8 for fixing the stacked toner image onto the image support P and forming a glossy surface at the same time. At the upper portion of the image forming apparatus main body "A" is disposed the manuscript image reader SC for optically scanning a manuscript to read image information in the form of digital data.

The image forming apparatus further includes the image processing unit 30 (see FIG. 1) for performing the aforementioned specific: image processing on the digital data (the manuscript image data) obtained by the manuscript image reader SC.

The clear toner image formation unit 20S, which forms a clear toner image on a photoreceptor drum 21S, includes: a charging unit 22S for providing a uniform potential to the surface of the photoreceptor drum 21S around the photoreceptor drum 21S that is an image forming body; the exposure unit 23S for performing an exposure in accordance with an exposure image signal supplied by the image processing unit 30 on the uniformly charged photoreceptor drum 21S so as to form an electrostatic latent image corresponding to a clear toner image; a developing unit 24S for conveying a clear toner onto the photoreceptor drum 21S so as to allow the electrostatic latent image to appear; and a cleaning unit 25S for collecting a residual toner that remains on the photoreceptor drum 21S after the primary transfer.

The color toner image formation units 20Y, 20M, 20C, and 20Bk, which each nave the same configuration as that of the clear toner image formation unit 20S, are configured to form a toner image with the yellow toner, the magenta toner, the cyan toner and the black toner in place of a clear toner.

Note that in this specification, individual components will be designated by symbols with the following suffixes: S (clear toner), Y (yellow), M (magenta), C (cyan) and Bk (black). The components will be collectively denoted by reference symbols with the alphabetical suffixes omitted.

The photoreceptor drum 21 has, for example, an organic photosensitive body that includes a photosensitive layer of a resin which contains an organic photoconductor and which is formed around the outer peripheral surface of a drum-shaped metal base. The photoreceptor drum 21 is disposed so as to extend in the width direction of the image support P being conveyed (in a direction perpendicular to the paper plane of FIG. 2). The resin used to form the photosensitive layer may be, for example, a polycarbonate resin.

The charging unit 22 to be employed may be a corona discharging type charger.

The exposure unit 23 may be a light radiating device which employs light-emitting diodes as an exposure light source and which is, for example, formed of image-forming elements and an LED part with light-emitting elements of light-emitting diodes arranged, in an array in the axial direction of the photoreceptor drum 21. Or alternatively, the exposure unit 23 may be a laser radiating device of a laser optical assembly using a semiconductor laser as the exposure light source. The image forming apparatus of FIG. 2 employs the laser radiating device.

The exposure unit 23 according to the present invention may employ, as an exposure light source, for example, a semiconductor laser having a lasing wavelength of 350 to 850 nm. Such an exposure light source can be used with the exposure dot diameter (the laser beam diameter) reduced to 10 to 80 μm to perform a digital exposure on the photoreceptor drum 21. This makes it possible to form, on the photoreceptor drum 21, an electrostatic latent image that corresponds to the color image signal of each color obtained through the screen processing using a screen pattern having a screen line count of 50 to 270 lpi.

The intermediate transfer unit 7 includes: an endless intermediate transfer belt 26 which is rotatably wound over a plurality of rollers and supported to be capable of circulating; primary transfer rollers 27S, 27Y, 27M, 27C and 27Bk for transferring, onto the intermediate transfer belt 26, the clear toner image formed by the clear toner image formation unit 20S and the color toner image of each color formed by the color toner image formation units 20Y, 20M, 20C and 20Bk, respectively; secondary transfer rollers 29 for transferring, onto the image support P, the clear toner image and the color toner image which nave been transferred to the intermediate transfer belt 26 by the primary transfer rollers 27S, 27Y, 27M, 27C and 27Bk; and a cleaning unit 261 for collecting residual toner remaining on the intermediate transfer belt 26.

The primary transfer rollers 27S and 27Bk in the intermediate transfer unit 7 are in contact with the photoreceptor drum 21Bk all the time during image forming processing, while the other primary transfer rollers 27Y, 27H and 27C are brought into contact with the respectively corresponding photoreceptor drums 21Y, 21M and 21C only when a color image is formed.

Furthermore, the secondary transfer rollers 29 are brought info contact with the intermediate transfer belt 26 only when the image support P passes therethrough for the secondary transfer operation.

The intermediate transfer belt 26 is, for example, an endless belt having a volume resistivity or $10^6$ to $10^{12}$ Ω·cm. The intermediate transfer belt 26 may be made of a resin material such as polycarbonate (PC), polyimide (PT), polyamide-imide (PAI), polyvinylidene fluoride (PVDF) or tetrafluoro-ethylene-ethylene copolymer (ETFE). The intermediate transfer belt 26 preferably has a thickness of 50 to 200 μm.

The fixing unit 8 heats and melts the stacked toner image formed on the image support P and then cools down the melted stacked toner image, thereby fixing the stacked toner image on the image support P as well as forming a glossy surface.

More specifically, the fixing unit 8 includes: a heating and pressurizing device 10 made up of a heating roll 101 and a pressurizing roll 102 which heat as well as pressurise at the same time the image support P with the stacked toner image formed thereon and which are actuated at constant speed in contact with each other or in contact with each other under pressure; a belt member 11 which is in contact with the surface of the stacked toner image melted by the heating and pressurizing device 10 and forms an adhesion surface between the belt member 11 and the stacked toner image to convey the image support P; cooling fans 12 and 13 for supplying cooling air to the image support P which is being conveyed while being adhered to the belt member 11; and a conveyance auxiliary roll 14 for conveying the image support P which has been cooled, down, by the action of the air supplied by the cooling fans 12 and 13 and to which surface of the stacked toner image is thus fixed.

The heating roll 101 is made, for example, in a manner such that the surface of a metal base such as of aluminum is covered with an elastic body layer of silicone rubber or the like, and a heating source such as a halogen lamp of 300 to 350 W is provided inside the heating roll 101.

The pressurizing roll 102 is made, for example, in a manner such that the surface of a metal substrate such as of aluminum is covered with an elastic body layer of silicone rubber or the like and the surface of the elastic beefy layer is also covered, e.g., with a tube of a tetrafluoroethylene-perfluoroalkylvinylether copolymer (PFA). Inside the pressurizing roll 102, it is also possible to provide as a heating scarce, for example, a halogen lamp of 300 to 350 W.

The belt member 11 is rotatably supported by the heating roll 101 and support rolls 103 and 104, and made up of an endless belt that is rotationally driven by a driving source (not shown).

More specifically, the belt member 11 is preferably formed of a heat-resistant film resin such as polyimide, polyether polyimide, a polyether sulfone resin (PES) or a tetrafluoroethylene-perfluoroalkylvinylether copolymer resin (PFA). Furthermore, at least the surface of the heat-resistant film resin that is in contact with the stacked, toner image is preferably provided with a surface layer at a fluorocarbon resin, such as polytetrafluoroethylene (PTFE) and PFA or silicone rubber.

For example, the thickness of the belt member 11 is preferably made such that the heat-resistant film resin is 20 to 80 μm in thickness, the surface layer is 1 to 30 μm in thickness, and the belt member 11 is 20 to 110 μm in the entire thickness.

Operation of the Image Forming Apparatus:

The image forming apparatus of this example is configured such that the clear Image signal S, the yellow image signal Y, the magenta image signal M, the cyan image signal C and the black image signal Bk, which are obtained through the aforementioned specific image processing and used for exposure, are outputted to the exposure units 23S, 23Y, 23M, 23C and 23Bk, respectively, so as to perform the image forming method.

More specifically, first, in the clear toner image formation unit 20S and the color toner image formation units 20Y, 20M, 20C and 20Bk, the surfaces of the photoreceptor drums 21S, 21Y, 21M, 21C and 21Bk are charged by the charging units 22S, 22Y, 22M, 22C and 22Bk.

Then, the exposure units 23S, 23Y, 23M, 23C and 23Bk are operated according to the clear image signal S, the yellow image signal Y, the magenta incase signal M, the cyan image signal C and the black image signal Bk which are outputted from the image processing unit 30, respectively. More specifically, the exposure light source emits a laser beam which is modulated corresponding to the clear image signal S, the yellow image signal Y, the magenta image signal M, the cyan image signal C or the black image signal Bk. The photoreceptor drums 21S, 21Y, 21M, 21C and 21Bk are scanned with and exposed to the laser beams, thereby allowing respective electrostatic latent images according to the toner image of each color associated with each color of yellow, magenta, cyan and black corresponding to the manuscript read by the manuscript image reader SC to be formed on the photoreceptor drums 21Y, 21M, 21C and 21Bk, respectively. Furthermore, an electrostatic latent image according to a clear toner image to which the amount of clear toner associated with the total amount of adhered toner of the toner image of each color is supplied is formed on the photoreceptor drum 21S.

Then, the electrostatic latent image formed on each of the photoreceptor dreams 21S, 21Y, 21M, 21C and 21Bk is developed with the clear toner or the toner of each color in the respective developing units 24S, 24Y, 24M, 24C and 24Bk, thereby allowing the clear toner image and the toner image of each color to be formed, respectively. Then, the clear toner image and the toner image of each, color are successively transferred onto the intermediate transfer belt 26 by primary transfer rollers 25S, 25Y, 25M, 25C and 25Bk so as to be superimposed one on another and thereby combined.

The toner images superimposed on the intermediate transfer belt 26 includes the clear toner image, the yellow toner image, the magenta toner image, the cyan toner image and the black toner image, which are sequentially deposited one on another in that order from the side of the intermediate transfer belt 26.

Then, the image support P such as a sheet of ordinary paper or a transparent sheet accommodated in a paper feed cassette 40 is fed by a paper feed unit 41 so as to be conveyed to the secondary transfer rollers 29, so that the toner images combined on the intermediate transfer belt 26 by the secondary transfer rollers 29 are collectively transferred onto the image support P, and thus the stacked toner image is formed on the image support P.

The stacked toner image formed on the image support P is made up of the following images deposited sequentially from the side of the image support P: a color toner image including the black toner image, the cyan toner image, the magenta toner image and the yellow toner image, which are deposited one on another; and a clear toner image. This stacked toner Image is entirely equalized in thickness in a manner such that the less the amount of color toners deposited, on a portion in the color toner image, the greater the amount of the clear toner deposited on that portion becomes.

For example, in the fixing unit 8, the stacked toner image transferred onto the image support P is heated and pressurized to be thereby fixed, and at the same time, provided with a glossy surface to form a glossy image.

More specifically, the image support P having the stacked toner image formed thereon is conveyed to the pressure contact portion formed between the heating roll 101 and the pressurizing roll 102 while the surface of the image support P on which the stacked toner image is formed is in contact with the heating roll 101. While the image support P is passing through the pressure contact portion, the clear toner and the color toner are heated and melted, and at the same time, fused together as a toner layer on the image support P. Furthermore, the image support P is conveyed while the fused toner layer is in intimate contact with the outer surface of the belt member 11, so that the toner layer is forcedly cooled down by the cooling fans 12 and 13 and hardened. Then, at the curved portion of the belt member 11 (at which the support roll 103 is disposed), the rigidity of the image support P causes itself to be peeled off the belt member 11 and separated from the belt member 11 due to gravity being transferred to the conveyance auxiliary roll 14.

Subsequently, the image support P having the glossy image formed thereon is ejected out of the apparatus so as to be placed on an output paper tray 30.

After the clear toner image and the toner image of each color have been transferred to the intermediate transfer belt 20, the photoreceptor drums 21S, 21Y, 21M, 21C and 21Bk are cleared, of toner left en the photoreceptor drums 21S, 21Y, 21M, 21C and 21Bk by the respective cleaning units 26S, 26Y, 26M, 26C and 26Bk, and then made available for the formation of the next clear toner image and the next toner image of each color.

On the other hand, after the stacked toner image is transferred by the secondary transfer rollers 29 onto the image support P and the image support P is separated at the curvature portion, the intermediate transfer belt 26 is cleared of toners remaining on the intermediate transfer belt 26 by the cleaning unit 261, and then made available for intermediate transfer of the next stacked toner image, Toner and Developer:

As used herein, "the clear toner" is defined as a toner which does not contain any colorant each as a pigment and a dye. However, for example, even those toners which contain a trace amount of a colorant such as a pigment and a dye or which contain a colored binder resin, wax, or a colored external additive may also be referred to as the clear toner only if those toners are substantially colorless transparent toners which allow the color of the fixed layer obtained through the fixing process not to be recognised due to the action of light absorption or light scattering.

On the other hand, as used herein, "the color toner" refers to those that contain a colorant such as a pigment and a dye, i.e., all the toners other than the clear toner, including chromatic toners such as yellow, magenta and cyan toners, and achromatic toners such as black, white and gray toners.

The toners to be used in the image forming method of the present invention may be either a pulverized toner or a polymerized toner. However, in the image forming method of the present invention, from the viewpoint eel availability of stable particle diameter distribution, it is preferable to employ the polymerised toner that is prepared by polymerization.

The polymerized toner refers to the toner to be obtained in a manner seen that the generation of the binder resin forming the toner and the formation of the shape of toner particles are performed in parallel, by the polymerisation of a raw material monomer for obtaining the binder resin and the subsequent chemical processing as required.

More specifically, the polymerized toner refers to the toner which is formed through the step of obtaining resin fine particles by polymerisation reaction such as suspension polymerization or emulsion polymerization and the subsequent step, to be carried out as required, of fusing the resin fine particles together.

The average particle diameter of the toner is preferably 3 to 10 μm in volume-based median diameter, more preferably 3 to 7 μm. The average particle diameter of the toner falls within the aforementioned range, thereby providing a toner of a small particle diameter while providing a desired resolution and reducing the amount of abundance of fine-grained toner. This in turn provides improvement of the reproducibility of dot images for a long period of time and makes it possible to form a stable image with favorable sharpness.

In the image forming method of the present invention, ail the color toners (the yellow toner, the magenta toner, the cyan toner and the black, toner) preferably have an equal average particle diameter. Furthermore, the average particle diameter (the volume-based median diameter) of the clear toner is preferably less than the volume-based median diameter of the color toner. Use of the clear toner that has a smaller particle diameter than that of the color toner will reduce the amount of the clear toner required to eliminate the unevenness of the surface of an image.

Developer:

The toners according to the present invention may be used on their own as a one-component developer or may be mixed with a carrier so as to be used as a two-component developer.

One-component developers may include a non-magnetic one-component developer or a magnetic one-component developer which contains magnetic particles or about 0.1 to 0.5 μm in the toner, and either can be employed.

Furthermore, when the two-component developer or the mixture with a carrier as employed, the magnetic particles of the carrier may be made of a conventionally well-known material, for example, a metal such as iron, termite and magnetite, or an alloy of such a metal and aluminum or lead. In particular, the ferrite particles are preferable. The aforementioned magnetic particles are preferably 15 to 100 μm in the volume average particle diameter, more preferably 25 to 80 μm.

The volume average particle diameter of the carrier can be measured typically by the laser diffraction type particle diameter distribution measuring device "HELOS" (manufactured by SYMPATEC) which includes a wet dispenser.

The carrier is preferably made of these magnetic particles that are further covered with a resin, or alternatively, a so-called resin dispersion type carrier with magnetic particles dispersed in a resin. Although the composition of the coating resin is not limited to a particular one, examples of those resins that can be employed may include an olefin-based resin, a styrene-based resin, a styrene-acryl-based resin, a silicone-based resin, an ester-based resin, and a fluorine-containing polymer-based resin. On the other hand, the resin that forms the resin dispersion type carrier is not limited to a particular one bat any well-known resin aura also be employed. For example, it is possible to employ a styrene-acryl-based resin, a polyester resin, a fluorine-based resin, or a phenol resin.

Image Support:

Examples of the image support that can be used for the image forming method of the present invention may include thin and thick sheets of ordinary paper, high quality paper, art paper, coated printing paper such as coated paper, commercially available Japanese paper or postcard paper, OHP plastic film, and cloth.

While the embodiment of the present invention has been specifically described, embodiments of the present invention are not limited to the aforementioned examples but may also be modified in a variety of ways.

EXAMPLE

Now, the present invention will be further described in accordance with specific examples, but the present invention will not be limited, thereto.

Example 1

Figure 3:
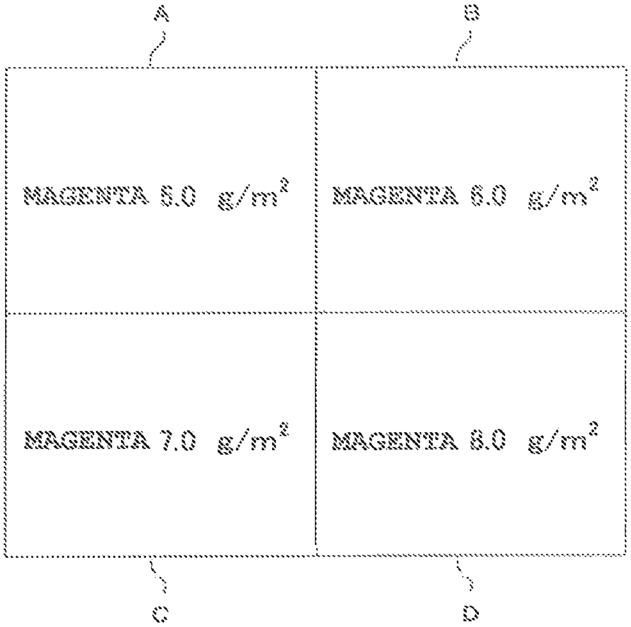
FIG. 3 is a schematic view illustrating the configuration of test images to be formed in Examples and Comparative Examples.
Figure 3:
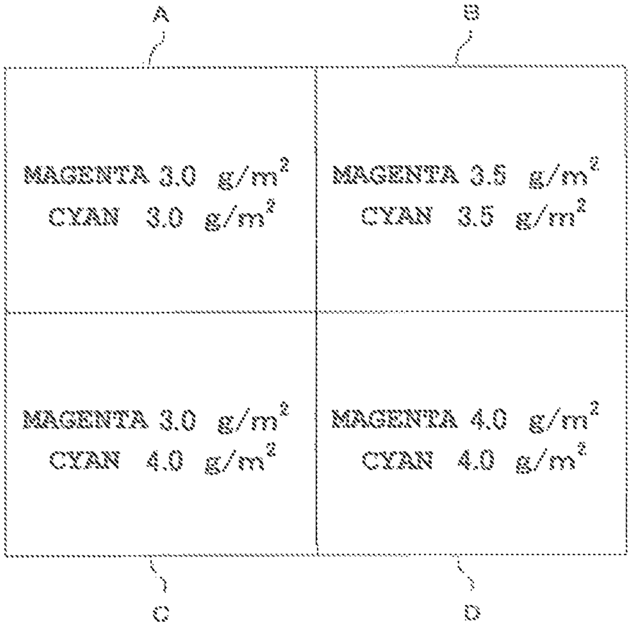

The image forming apparatus shown in FIG. 2 was used to form, on a sheet of ordinary paper, a test image [1] having image regions A to B with varying densities in magenta in one image as shown in FIG. 3(*a*). At this time, the magenta toner image was formed in accordance with a magenta image signal obtained through the screen processing using a dot screen pattern having a screen line count of 190 lpi. Furthermore, the clear toner image was formed in accordance with a clear image signal obtained through the contone processing. The clear image signal is assumed to have been controlled so that the total amount (the pre-set amount) of (the adhered magenta toner+the adhered clear toner) was 10 g/m$^2$.

In the test image shown in FIG. 3(*a*), the numerical value in each image region indicates the amount of adhered magenta toner.

Example 2

The image forming apparatus shown in FIG. 2 was used to form, on a sheet of ordinary paper, a test image [2] having image regions A to D with varying densities in magenta and cyan in one image as shown in FIG. 3(*b*). At this time, the magenta toner image and the cyan toner image were formed in accordance with a magenta image signal and a cyan image signal obtained through the screen processing using a dot screen pattern having a screen line count of 190 lpi. Furthermore, the clear toner image was formed in accordance with a clear image signal obtained through the contone processing. The clear image signal is assumed to have been controlled so that the total amount (the pre-set amount) of (the adhered magenta toner+the adhered cyan toner+the adhered clear toner) was 10 g/m$^2$.

In the test image shown in FIG. 3(*b*), the upper numerical value in each image region indicates the amount of adhered magenta toner, while the lower numerical value indicates the amount of adhered cyan toner.

Example 3

A test image [3] was formed in the same manner as in Example 1 except that the magenta toner image was formed using a screen pattern having a screen line count of 270 lpi in Example 1.

Example 4

A test image [4] was formed in the same manner as in Example 2 except that the magenta toner image and the cyan toner image were formed using a screen, pattern having a screen line count of 270 lpi in Example 2.

Example 5

A test image [5] was formed in the same manner as in Example 2 except that the magenta toner image and the cyan toner image were formed using a screen pattern having a screen line count of 50 lpi in Example 2.

Example 6

A test image [6] was formed, in the same manner as in Example 2 except that the magenta, toner image and the cyan toner image were formed using a screen pattern having a screen line count of 80 lpi in Example 2.

Comparative Example 1

A test image [7] was obtained in the same manner as in Example 2 except that the magenta image signal and the cyan image signal for forming the magenta toner image and the cyan toner image were obtained through the contone processing in Example 2.

Comparative Example 2

A test image [8] was obtained in the same manner as in Example 2 except that the clear image signal for forming the clear toner image was obtained through the screen processing using a dot screen pattern having a screen line count of 190 lpi in Example 2.

Comparative Example 3

A test image [9] was obtained in the same manner as in Example 4 except that the clear image signal for forming the clear toner image was obtained through the screen, processing using a dot screen pattern, having a screen line count of 270 lpi in Example 4.

Comparative Example 4

A test image [10] was obtained, in the same manner as in Example 2 except that the magenta toner image said the cyan toner image were formed using a screen pattern having a screen, line count of 40 lpi, while the clear image signal for forming the clear toner image was obtained through the screen processing using a dot screen pattern having a screen line count of 40 lpi in Example 2.

(1) Evaluation of Color Saturation

The resulting test images [1] to [10] were measured for L*, a* and b*, and color saturation C* was computed according to Equation (1) below:

$$\text{Color saturation } C^*=[(a^*)^2+(b^*)^2]^{1/2} \qquad \text{Equation (1)}$$

L*, a*, and b* were measured by means of a spectrophotometer "Gretag Macbeth Spectrolino" (manufactured by Gretag Macbeth) using the D65 light source as a light source, with a reflection measurement aperture ϕ=4 mm, at intervals of 10 nm over a measurement wavelength region of 380 to 730 nm, at a viewing angle of 2°, and using a dedicated white tile for calibration.

For evaluation of the color saturation of the test images, each of the image regions a, to D was measured, so that the difference between (ΔE) the maximum and minimum measurement values was determined to be sat an acceptable level when the difference was not greater than three. The results are shown in Table 1, (2) Evaluation of a Gloss:

Each of the resulting test images [1] to [10] was measured for the level of gloss in conformity with JIS Z8741 1997 using a gloss meter "GMX-203" manufactured by MURAKAMI COLOR RESEARCH LABORATORY) at an angle of incidence set to 20°.

For evaluation of gloss of the test images, arbitrarily selected five points in each of the image regions A to D were measured, and the arithmetic average value was computed, so that, the difference (ΔG) between the maximum and minimum values among the image regions A to D was determined to be at an acceptable level in the present invention when the difference was not smaller than five. The results are shown in Table 1, (3) Evaluation of Occurrence of Moire:

Each of the resulting test images [1] to [10] was evaluated in terms of image quality in accordance with the evaluation criteria below. The results are shown in Table 1.

TABLE 1

| | Test image No. | Image processing: Clear toner image | Image processing: Color toner image | Image processing: Screen line count | Evaluation result: Color saturation (ΔE) | Evaluation result: Gloss (ΔG) | Evaluation result: Occurrence of moire |
|---|---|---|---|---|---|---|---|
| Example 1 | [1] | Contone processing | Screen processing | 190 lpi | 1.3 | 12 | A |
| Example 2 | [2] | Contone processing | Screen processing | 190 lpi | 1.1 | 9 | A |
| Example 3 | [3] | Contone processing | Screen processing | 270 lpi | 2.4 | 7 | A |
| Example 4 | [4] | Contone processing | Screen processing | 270 lpi | 2.1 | 5 | A |
| Example 5 | [5] | Contone processing | Screen processing | 50 lpi | 0.9 | 13 | A |
| Example 6 | [6] | Contone processing | Screen processing | 80 lpi | 0.8 | 15 | A |
| Comparative Example 1 | [7] | Contone processing | Contone processing | — | 8.0 | 2 | A |
| Comparative Example 2 | [8] | Screen processing | Screen processing | 190 lpi | 4.8 | 3 | C |
| Comparative Example 3 | [9] | Screen processing | Screen processing | 270 lpi | 6.2 | 3 | C |
| Comparative Example 4 | [10] | Screen processing | Screen processing | 40 lpi | 3.2 | 4 | C |

Evaluation criteria -

A: So moire was found (acceptable).

B: Moire was slightly found but not problematic in practice (acceptable)

C: Moire was found and problematic in practical use (non acceptable)

REFERENCE SIGNS LIST

7 Intermediate transfer unit
8 Fixing unit
10 Heating and pressurizing device
101 Heating roll
102 Pressurizing roll
103, 104 Support roll
11 Belt member
12, 13 Cooling fan
14 Conveyance auxiliary roll
20S Clear toner image formation unit
20Y, 20M, 20C, 20Bk Color toner image formation unit
21S, 21Y, 21M, 21C, 21Bk Photoreceptor drum
22S, 22Y, 22M, 22C, 22Bk Charging unit
23S, 23Y, 23M, 23C, 23Bk Exposure unit
24S, 24Y, 24M, 24C, 24Bk Developing unit
25S, 25Y, 25M, 25C, 25Bk Cleaning unit
26 Intermediate transfer belt
261 Cleaning unit
27S, 27Y, 27M, 27C, 27Bk Primary transfer roller
29 Secondary transfer roller
30 image processing unit
40 Paper feed cassette
41 Paper feed unit
90 Output paper tray
A Image forming apparatus main body
P Image support
SC Manuscript image reader

The invention claimed is:

1. An image forming method that employs an electrophotographic system to form a stacked toner image which has a color toner image of a color toner and a clear toner image of a clear toner superimposed one on another in that order on an image support, and then collectively fixes the resulting stacked toner image on the image support, the image forming method comprising:

forming the color toner image in accordance with a color image signal obtained through screen processing using a screen pattern having a screen line count of 50 to 270 lpi on manuscript image data; and forming the clear toner image in accordance with a clear image signal obtained through contone processing on the manuscript image data, wherein the clear image signal for forming the clear toner image is controlled so that according to an amount of the color toner per unit area of the stacked toner image obtained by the color toner image being superimposed with the clear toner image, the less the amount of the color toner per unit area, the more an amount of the clear toner becomes, and wherein the clear toner has a volume-based median diameter that is smaller than a volume-based median diameter of the color toner.

2. The image forming motion according to claim 1, wherein the color toner image is formed using a screen pattern having a screen line count of 80 to 200 lpi.

3. The image forming method according to claim 1, wherein the color toner and the clear toner each have a volume-based median diameter of 3 to 10 μm.

4. The image forming method according to claim 1, wherein the clear image signal is controlled in a manner such that a compensating amount of the clear toner is supplied depending on an amount of adhered color toner for forming the color toner image so that a total amount of adhered color and clear toners is a pre-set amount of adhered toner.

5. The image forming method according to claim 4, wherein the method employs, as the color toner, a yellow toner, a magenta toner, a cyan toner and a black toner, and forms a solid image which has the amount of adhered toner of each of the yellow toner, the magenta toner, the cyan toner and the black toner of not more than 4 $g/m^2$ and which has the total amount of adhered toner of the yellow toner, the magenta toner, the cyan toner and the black, toner of greater than 3.0 $g/m^2$ and not greater than 10 $g/m^2$; and the pre-set amount of adhered toner falls within the range of 3.1 to 10.1 $g/m^2$.

6. The image forming method according to claim 4, wherein the method employs, as the color toner, a yellow toner, a magenta toner, a cyan toner and a black toner, and forms a halftone image which has the total amount of adhered toner of each of the yellow toner, the magenta toner, the cyan toner and the black toner of 0.5 to 3.0 $g/m^2$; and the pre-set amount of adhered toner falls within the range of 0.6 to 3.1 $g/m^2$.

7. An image forming method that employs an electrophotographic system to form a stacked toner image which has a color toner image of a color toner and a clear toner image of a clear toner superimposed one on another in that order on an image support, and then collectively fixes the resulting stacked toner image on the image support, the image forming method comprising:

forming the color toner image in accordance with a color image signal obtained through screen processing using a screen pattern having a screen line count of 50 to 270 lpi on manuscript image data; and forming the clear toner image in accordance with a clear image signal obtained through contone processing on the manuscript image data, wherein the clear image signal for forming the clear toner image is controlled so that according to an amount of the color toner per unit area of the stacked toner image obtained by the color toner image being superimposed with the clear toner image, the less the amount of the color toner per unit area, the more an amount of the clear toner becomes, and the clear image signal is controlled in a manner such that a compensating amount of the clear toner is supplied depending on an amount of adhered color toner for forming the color toner image so that a total amount of adhered color and clear toners is a pre-set amount of adhered toner;

the method employs, as the color toner, a yellow toner, a magenta toner, a cyan toner and a black toner, and forms a solid image which has the amount of adhered toner of each of the yellow toner, the magenta toner, the cyan toner and the black toner of not more than 4 $g/m^2$ and which has the total amount of adhered toner of the yellow toner, the magenta toner, the cyan toner and the black, toner of greater than 3.0 $g/m^2$ and not greater than 10 $g/m^2$; and the pre-set amount of adhered toner falls within the range of 3.1 to 10.1 $g/m^2$.

8. The image forming motion according to claim 7, wherein the color toner image is formed using a screen pattern having a screen line count of 80 to 200 lpi.

9. The image forming method according to claim 7, wherein the color toner and the clear toner each have a volume-based median diameter of 3 to 10 μm.

10. The image forming method according to claim 9, wherein the clear toner has a volume-based median diameter that is smaller than the volume-based median diameter of the color toner.

11. An image forming method that employs an electrophotographic system to form a stacked toner image which has a color toner image of a color toner and a clear toner image of a clear toner superimposed one on another in that order on an image support, and then collectively fixes the resulting stacked toner image on the image support, the image forming method comprising:

forming the color toner image in accordance with a color image signal obtained through screen processing using a screen pattern having a screen line count of 50 to 270 lpi on manuscript image data; and forming the clear toner image in accordance with a clear image signal obtained through contone processing on the manuscript image data, wherein the clear image signal for forming the clear toner image is controlled so that according to an amount of the color toner per unit area of the stacked toner image obtained by the color toner image being superimposed with the clear toner image, the less the amount of the color toner per unit area, the more an amount of the clear toner becomes, and the clear image signal is controlled in a manner such that a compensating amount of the clear toner is supplied depending on an amount of adhered color toner for forming the color toner image so that a total amount of adhered color and clear toners is a pre-set amount of adhered toner; and the method employs, as the color toner, a yellow toner, a magenta toner, a cyan toner and a black toner, and forms a halftone image which has the total amount of adhered toner of each of the yellow toner, the magenta toner, the cyan toner and the black toner of 0.5 to 3.0 $g/m^2$; and the pre-set amount of adhered toner falls within the range of 0.6 to 3.1 $g/m^2$.

12. The image forming motion according to claim 11, wherein the color toner image is formed using a screen pattern having a screen line count of 80 to 200 lpi.

13. The image forming method according to claim 11, wherein the color toner and the clear toner each have a volume-based median diameter of 3 to 10 μm.

14. The image forming method according to claim 13, wherein the clear toner has a volume-based median diameter that is smaller than the volume-based median diameter of the color toner.

* * * * *